United States Patent [19]
Seo

[11] Patent Number: 5,929,944
[45] Date of Patent: Jul. 27, 1999

[54] FREQUENCY VARIATION COMPENSATING METHOD FOR A VIDEO RECEIVING APPARATUS

[75] Inventor: Jeong Soo Seo, Suwon, Rep. of Korea

[73] Assignee: Samsung Electronics Co., Ltd., Kyungki-Do, Rep. of Korea

[21] Appl. No.: 08/788,757

[22] Filed: Jan. 24, 1997

[30] Foreign Application Priority Data

Jan. 25, 1996 [KR] Rep. of Korea .................. 96-1630

[51] Int. Cl.⁶ .................. H04N 5/50; H04N 5/45
[52] U.S. Cl. .................. 348/731; 348/725; 348/735; 348/565; 348/553; 348/564
[58] Field of Search .................. 348/731, 565, 348/553, 725, 735, 732, 733, 564, 566, 567, 568; H04N 5/50, 5/45

[56] References Cited

U.S. PATENT DOCUMENTS

| | | | |
|---|---|---|---|
| 4,682,234 | 7/1987 | Naimpally | 358/183 |
| 5,285,284 | 2/1994 | Takashima et al. | 348/731 |
| 5,296,931 | 3/1994 | Na | 348/731 |
| 5,371,550 | 12/1994 | Shibutani et al. | 348/731 |
| 5,442,452 | 8/1995 | Ryu | 348/565 |
| 5,680,177 | 10/1997 | Abe | 348/565 |
| 5,729,300 | 3/1998 | Ahn | 348/565 |
| 5,734,444 | 3/1998 | Yoshinobu | 348/731 |
| 5,754,253 | 5/1998 | Lee | 348/565 |

*Primary Examiner*—John K. Peng
*Assistant Examiner*—Jean W. Désir
*Attorney, Agent, or Firm*—Sughrue, Mion, Zinn, Macpeak & Seas, PLLC

[57] ABSTRACT

Two tuner sections are provided in a video receiving apparatus so that a first tuner receives and outputs a television broadcasting signal desired by a user, a second tuner section executes an automatic fine tuning operation at previously set time intervals to discriminate a deviation of the oscillating frequency of the local oscillating section, and when the deviation of the discriminated oscillating frequency is less than a previously set predetermined value, the local oscillating section of the first tuner section is controlled to continuously oscillate at a present oscillating frequency of the second tuner. When the deviation of the discriminated oscillating frequency is greater than a previously set predetermined value, the local oscillating frequency of the first tuner is controlled in accordance with the deviation of the discriminated oscillating frequency, and when a deviation is produced to the oscillating frequency of the local oscillating section, the television broadcasting signal of a predetermined channel can be compensated for accurate reception by varying the oscillating frequency.

4 Claims, 2 Drawing Sheets

FREQUENCY VARIATION COMPENSATING METHOD FOR A VIDEO RECEIVING APPARATUS

BACKGROUND OF THE INVENTION

1. Field of the Invention

The present invention relates to a frequency variation compensating method of a video receiving apparatus which provides for clear reception of a television broadcasting signal by compensating a local oscillating frequency of local oscillator during reception of a television broadcasting signal of predetermined channel by a video receiving apparatus.

2. Description of the Prior Art

A video receiving apparatus, such as a television receiver capable of receiving a television broadcasting signal or a video cassette tape recorder, includes a tuner for receiving a television broadcasting signal of a channel desired by a user.

The tuner section of the video receiving apparatus amplifies a signal received by an antenna at radio frequency amplifying section, variably changes an oscillating frequency of local oscillating section in accordance with the frequency of the television broadcasting signal of a channel to be received, and mixes the local oscillation signal of the local oscillating section to an output signal of the radio frequency amplifying section, thereby outputting an intermediate frequency signal.

The local oscillating section has to be exactly varied in oscillating frequency in response to a frequency of a television broadcasting signal of the channel desired to be received by a user, so that a television broadcasting signal of the desired channel is clearly received such that a clear picture without noise is displayed on a screen, and a voice signal can be output.

Therefore, the video receiving apparatus controls the local oscillating section to vary the oscillating frequency in response to the frequency of a received television broadcasting signal. An automatic fine tuning circuit is included in the video receiving apparatus so that an oscillating frequency of the local oscillating section can be constantly maintained.

The fine tuning circuit varies the level of a voice intermediate frequency signal in response to the oscillating frequency of the local oscillating section and converts the voice intermediate frequency signal of the received television broadcasting signal to a direct current. Therefore, the oscillating frequency is controlled by controlling the local oscillating section in response to the level of the direct current voltage. That is, the automatic fine tuning circuit varies the oscillating frequency of the local oscillating section, and determines the level of the direct current voltage of the voice intermediate frequency signal in response to the varying oscillating frequency of the local oscillating section, and the oscillating section is oscillated by an oscillating frequency becoming more than a predetermined level in a level of the direct current voltage of a discriminated voice intermediate frequency signal.

The automatic fine tuning circuit can exactly receive a television broadcasting signal by automatically controlling the oscillating frequency of the local oscillating section in response to a change of surrounding ambient temperature and humidity or various environmental changes when the video receiving apparatus receives a television broadcasting signal of a predetermined channel.

However, the automatic fine tuning circuit is operative only at an initial time of receiving the television broadcasting signal of the predetermined channel. The automatic fine tuning circuit cannot operate during reception of the television broadcasting signal.

That is, the automatic fine tuning circuit is operated each time the frequency of the television broadcasting signal is varied during channel selection or each time the oscillating frequency of the local oscillating section is varied, to control the oscillating frequency of the local oscillating section.

Since the oscillating frequency of the local oscillating section cannot be controlled by operating the automatic fine tuning circuit during reception of the television broadcasting signal of a predetermined channel, any distortion produced during reception is displayed on the video displaying screen and distortion in the voice signal is output.

Therefore, when a deviation is generated to the local oscillating section during viewing of a received television broadcasting signal of a predetermined channel, the television broadcasting signal cannot accurately be received. A user must turn off the electric power of the video receiving apparatus and then turn the power on again so that the television broadcasting signal of the predetermined channel is again adjusted by the automatic fine tuning circuit.

On the other hand, a television receiver provided with a PIP (Picture in Picture) function or a video receiving apparatus, such as a video cassette tape recorder, or a video receiving apparatus provided integrally with a television receiver and a video cassette tape recorder, includes two tuners.

That is, a television receiver provided with a PIP (Picture in Picture) function or a video receiving apparatus such as video cassette tape recorder receives a television broadcasting signal of a main picture by a main tuner, while a television broadcasting signal of PIP screen is received by a sub-tuner section. The television broadcasting signal of the received PIP screen displays two television broadcasting signals on one screen by inserting the television signal of the PIP screen into the television broadcasting signal of the main picture screen.

The video receiving apparatus provided integrally with the television receiver and the video cassette tape recorder both operate with two tuner sections when simultaneously viewing a television broadcasting signal received by a main tuner, and recording the television broadcasting signal received by sub-tuner section.

The video receiving apparatus provided with the two tuner sections uses only the main tuner section when the PIP function is not used or when simultaneous recording and viewing of television broadcasting signals is not being performed, and the sub-tuner section is not operated.

Therefore, the using range of the sub-tuner section is very limited, and it is inefficient.

SUMMARY OF THE INVENTION

Therefore, it is an object of the present invention to provide a frequency variation compensating method of a video receiving apparatus which operates an automatic fine tuning circuit during reception of a television broadcasting signal of predetermined channel.

In accordance with the frequency variation compensating method of the present invention, two tuner sections are utilized when a video receiving apparatus is provided with PIP function or when a video receiving apparatus is integrally provided with a television receiver and a video cassette tape recorder.

A separate sub-tuner section is provided in a video receiving apparatus including only one tuner section.

The main tuner section provided in the video receiving apparatus receives and outputs a television broadcasting signal desired by a user. The sub-tuner section receives a television broadcasting signal of the same channel as the main tuner section, and simultaneously performs an automatic fine tuning operation, thereby discriminating a deviation of the oscillating frequency of the local oscillating section.

When the deviation of the discriminated oscillating frequency is less than a predetermined value which has been previously established, the local oscillating section of the main tuner section continues to oscillate at a current oscillating frequency.

When the deviation of the discriminated oscillating frequency is more than a previously established predetermined value, the local oscillating section of the main tuner section is controlled by an oscillating frequency in accordance with the deviation of the discriminated oscillating frequency.

Therefore, in accordance with the present invention, when a deviation is produced in an oscillating frequency of the local oscillating section, a television broadcasting signal of a predetermined channel can be compensated to accurately receive the broadcasting signal by varying the oscillating frequency at only one time.

DETAILED DESCRIPTION OF THE PREFERRED EMBODIMENTS

The frequency variation compensating method of the present invention will be described in more detail with reference to the accompanying drawings.

Figure 1:
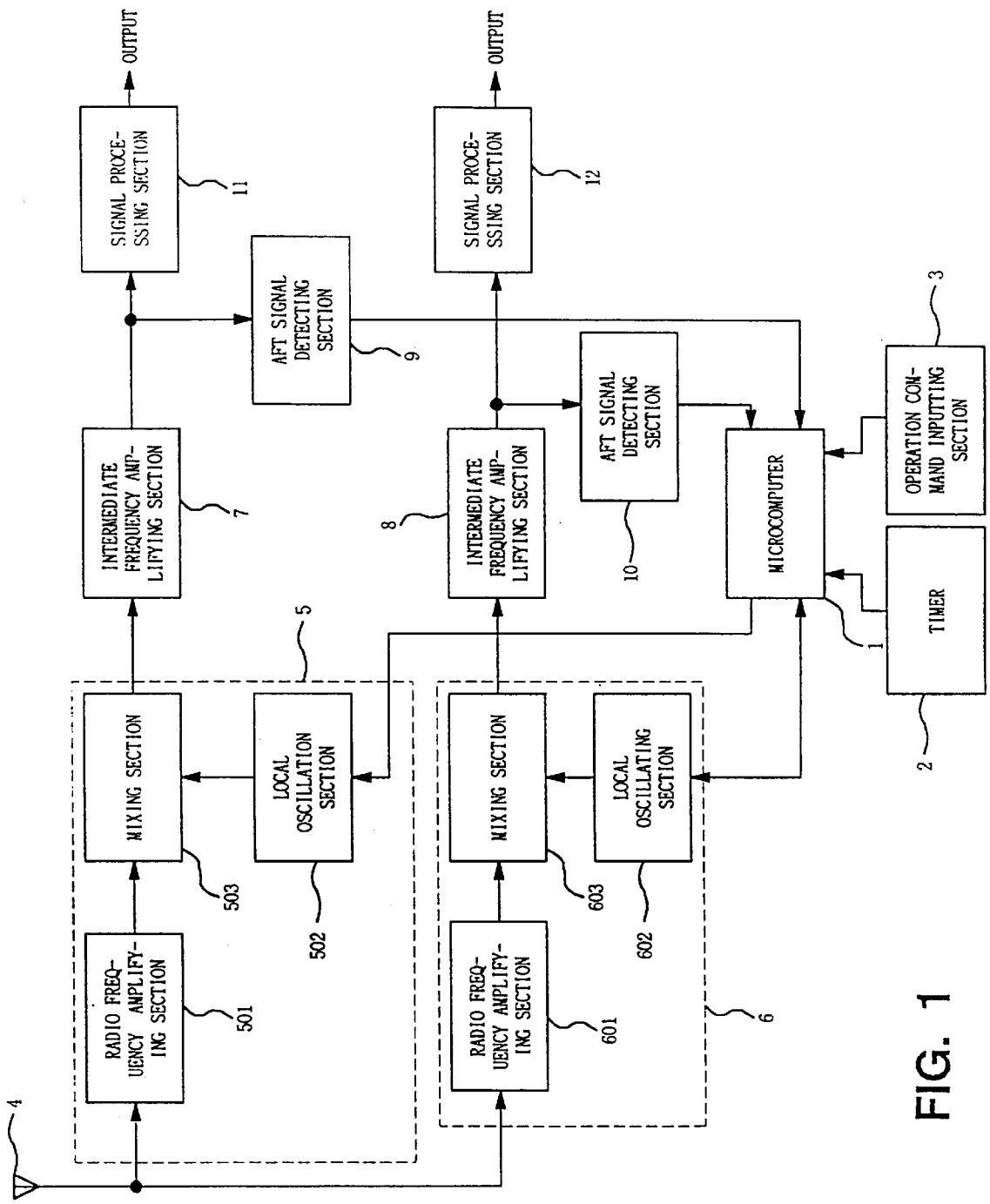
FIG. 1 is a circuit diagram showing a configuration of a video receiving apparatus for performing a frequency variation compensating method according to the present invention.

FIG. 1 is a circuit diagram illustrating a configuration of a video receiving apparatus for performing the frequency distortion compensating method of the present invention. The video receiving apparatus includes a microcomputer 1 for controlling reception of a television broadcasting signal of a predetermined channel and for executing an automatic fine tuning adjustment. A timer 2 calculates and outputs an elapsed time according to control of the microcomputer 1, an operation command inputting section 3 inputs an operation command input by a user to the microcomputer 1. The broadcasting signal is received by an antenna 4. The received signal is supplied to a main tuner section 5 and a sub-tuner section 6. Intermediate frequency amplifying sections 7, 8 are provided respectively for amplifying an intermediate frequency signal output from the main tuner section 5 and the sub-tuner section 6. Automatic fine tuning signal detecting sections 9, 10 respectively detect an automatic fine tuning control signal in accordance with the respective intermediate frequency signals output from the intermediate amplifying sections 7, 8. Signal processing sections 11, 12 each output a video signal and voice signal from the intermediate frequency signals output from the intermediate frequency amplifying sections 8, 9, respectively.

The main tuner section 5 and the sub-tuner section 6 each include a radio frequency amplifying section 501, 601 for radio-frequency-amplifying a received signal of the antenna 4, a local oscillating section 502, 602 for outputting a local oscillating signal oscillated in accordance with the control of the microcomputer 1, and a mixing section 503, 603 for mixing an output signal of the local oscillating section 502, 602 to an output signal of the radio frequency amplifying section 501, 601 thereby outputting an intermediate frequency signal.

In accordance with the video receiving apparatus constructed as described above, the television broadcasting signal received through the antenna 4 is amplified at each radio frequency amplifying section 501, 601 of the main tuner section 5 and the sub-tuner section 6, and input to the mixing section 502, 602.

The operation command inputting section 3 outputs a predetermined operation command input to the microcomputer 1 by an operator using a remote control transmitter or a keyboard provided in the video receiving apparatus.

The microcomputer 1 judges an operation command input from the operation command inputting section 3 and controls the video receiving apparatus to execute a predetermined operation according to the operation command.

When the operation command input from the operation command inputting section 3 is a selection of a channel, the microcomputer 1 controls each of the local oscillators 502, 602 of the main tuner section 5 and the sub-tuner section 6 to vary the frequency of the local oscillating signal, and the local oscillating signals of the predetermined frequency output by the local oscillators 502, 602 are respectively input to the mixer sections 503, 603.

Each mixing section 503, 603 mixes the local oscillating signal of the corresponding local oscillating section 502, 602 to the output signal of the radio frequency amplifying section 501, 601 to output to an intermediate frequency signal.

The intermediate frequency signal, output from each of the mixing sections 503, 603 of the main tuner 5 and the sub-tuner 6, is amplified at the intermediate frequency amplifying section 7, 8, and processed at the signal processing section 11, 12 to generate a video signal and a voice signal.

The intermediate frequency signal amplified at the intermediate frequency amplifying section 7, 8 is input to the automatic fine tuning signal detecting section 9, 10 whereby a direct current level of the voice intermediate frequency signal is detected, and the detected direct current level is input to the microcomputer 1.

The microcomputer 1 judges a receiving state of the television broadcasting signals received by the main tuner 5 and the sub-tuner 6, respectively, according to an output signal of the corresponding automatic fine tuning signal detecting sections 9, 10, and controls the oscillating frequency of each of the local oscillating sections 502, 602 to execute the automatic fine tuning operation.

Figure 2:
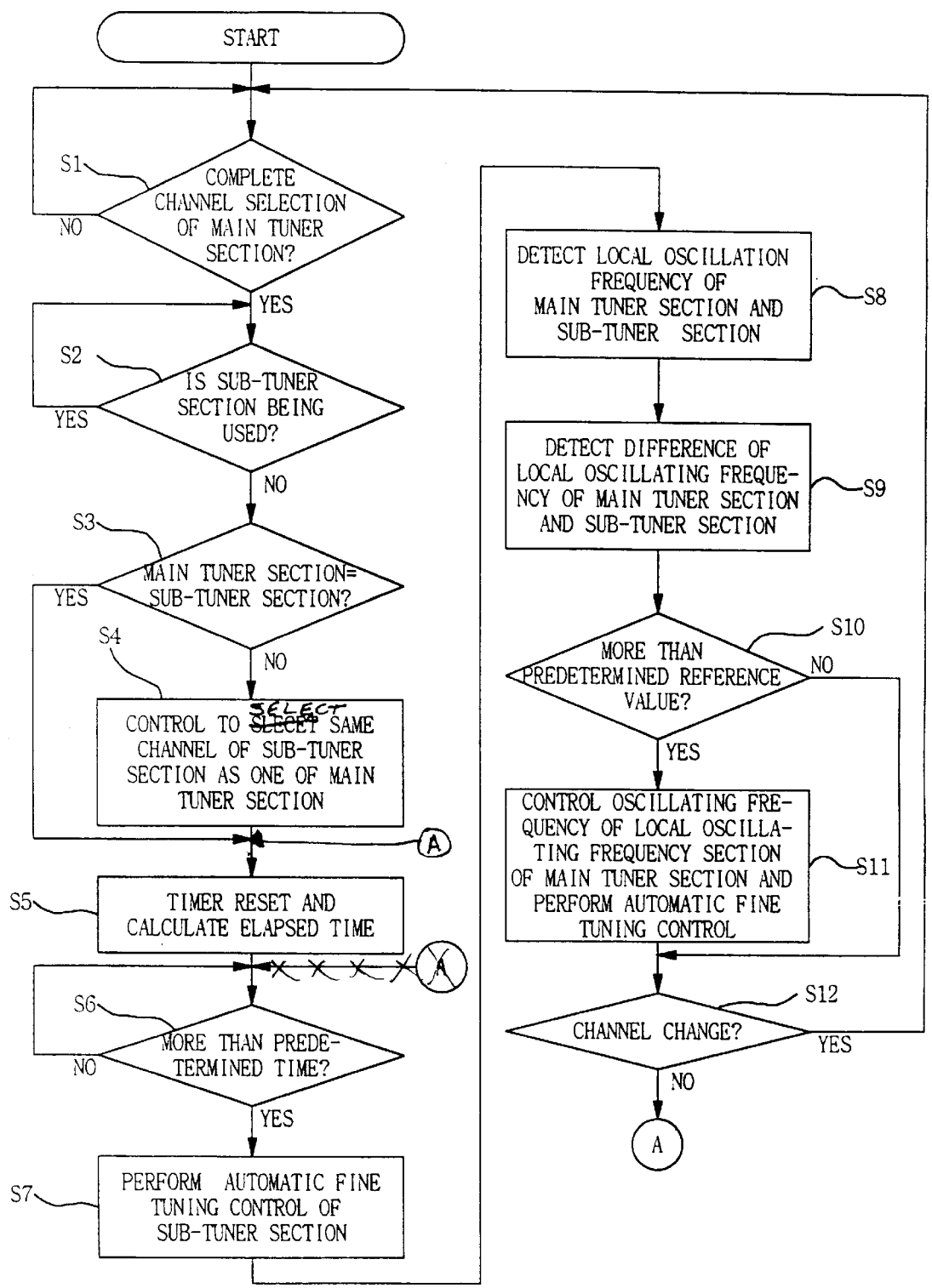
FIG. 2 is a flow chart illustrating the frequency variation compensating method according to the present invention.

FIG. 2 is a flow chart illustrating the frequency variation compensating method of the present invention. As illustrated therein, the microcomputer 1 judges whether or not a channel selection of the main tuning section 5 is completed at step S1.

That is, the microcomputer 1 controls the local oscillating section 502 of the main tuner 5, according to the operation command of the channel selection input from the operation command inputting section 3, to output the local oscillating signal of a predetermined frequency.

Then, as described above, the local oscillating signal of the local oscillating section 502 is mixed at the mixing section 503 with the television broadcasting signal amplified at the radio frequency amplifying section 501 such that the television broadcasting signal of the selected channel is converted to an intermediate frequency signal.

The intermediate frequency signal is amplified at the intermediate frequency amplifying section 7 and a direct current level of the voice intermediate frequency signal is detected by the automatic fine tuning signal detecting section 9. The microcomputer 1 controls the local oscillating frequency of the local oscillating section 502 in accordance with the detected level, and the selecting operation of the channel is completed.

When the selection of a channel is finished at step S1, the microcomputer 1 judges whether or not the sub-tuner section 6 is presently being used at step S2.

That is, in the case where the video receiving apparatus is provided with a PIP function, the microcomputer 1 judges whether or not the apparatus is presently executing a PIP function. In addition, in the case where the video receiving apparatus is integrally provided with a television receiver and a video cassette tape recorder, the microcomputer 1 judges whether or not the apparatus is simultaneously executing a recording operation and a viewing operation of the television broadcasting signal.

When the video receiving apparatus is only provided with the main tuner section 5, step S2 is not executed.

When the sub-tuner section 6 is not being used at step S2, the microcomputer 1 judges whether or not the main tuner section 5 and the sub-tuner section 6 receive the television broadcasting signal of same channel at step S3.

When the main tuner section 5 and the sub-tuner section 6 do not receive the same television broadcasting signals, the microcomputer 1 controls the sub-tuner section 6 to select the same channel as the main tuner section 5 so as to receive same television broadcasting signal.

That is, the microcomputer 1 controls the local oscillating section 602 of the sub-tuner section 6 to oscillate at the same frequency as the local oscillating signal frequency output by the local oscillating section 502 of the main tuning section 5.

The mixing section 603 then mixes the local oscillating signal of the local oscillating section 602 with the same television broadcasting signal as the television broadcasting signal used to obtain the intermediate frequency signal from the mixing section 503 to output the intermediate frequency signal.

When the channel selected by the main tuner section 5 and the channel selected by the sub-tuner section 6 are the same at step S3, or when it is so controlled that the sub-tuner section 6 selects the same channel as the channel selected by the main tuner section 5 at step S4, the timer 2 is reset and an elapsed time is calculated at step S5.

At step S6, the microcomputer 1 determines whether the elapsed time calculated by the timer 2 is greater than a previously set predetermined time when the answer in step S6 is yes, the automatic fine tuning control of the sub-tuner section 6 is executed in step S7 in response to the output signal of the automatic fine tuning signal detecting section 10.

At step S8, the local oscillating frequency of the local oscillating section 502 of the main tuner section 5 and the local oscillating frequency of the local oscillating section 602 of the sub-tuner section 6 are detected.

At step S9, a difference between the local oscillating frequency of the local oscillating sections 502, 602 is detected, and the microcomputer 1 determines whether the difference of the detected frequency is more than a previously set predetermined reference value at step S10.

When the difference of the frequency detected at step S10 is greater than the previously set predetermined reference value, at step 11, the local oscillating frequency of the local oscillating section 502 of the main tuner section 5 is controlled by the local oscillating frequency of the local oscillating section 602 of the sub-tuner section 6 whereby the automatic fine tuning control is executed.

When the difference of the frequency detected at step S10 is less than the previously set reference value or when the automatic fine tuning control is completed at step S11, at step S12, the microcomputer 1 determines whether or not the channel to the input signal of the operation command input section 3 has been changed.

At step S12, when it is determined that there has not been a change of channel, the automatic fine tuning control of the main tuner section 5 repeatedly executes steps beginning at step S5, and at step S12, in case of a change of the channel, the steps beginning at step S1 are repeatedly executed.

As described above, the present invention comprises two tuner sections in a video receiving apparatus, a television broadcasting signal of a channel desired by a user is received by the main tuner section whereby the user views it and simultaneously the automatic fine tuning control is executed by the sub-tuner section, and when a frequency difference of the local oscillating signal of the two tuner sections is more than a previously set reference value, the automatic fine tuning control is executed so that the local oscillating section of the main tuner section oscillates at the frequency of the local oscillating signal of the sub-tuner section.

Therefore, even during reception and viewing of the television broadcasting signal by the main tuner section, not only the automatic fine tuning control can be executed so that the received television broadcasting signal is not distorted.

What is claimed is:

1. A frequency compensation controlling method for a video receiving apparatus comprising a main tuner section and a sub-tuner section, said frequency compensation controlling method comprising the steps of:

controlling said sub-tuner section to select a signal corresponding to a channel which is the same as a channel selected by said main tuner section;

performing an automatic fine tuning operation of a signal output by said sub-tuner section;

performing an automatic fine tuning operation of a signal output by said main tuner section in accordance with a local oscillating frequency obtained during said fine tuning operation of said sub-tuner section.

2. The frequency compensation controlling method as defined in claim 1, wherein said controlling step comprises the steps of:

determining whether said sub-tuner section is receiving a signal corresponding to a channel other than the channel selected by said main tuner section; and controlling said sub-tuner section to select the same channel selected by said main tuner section when it is determined that said sub-tuner section is not receiving said signal.

3. The frequency compensation controlling method as defined in claim 1, wherein said step of performing an automatic fine tuning operation of said sub-tuner section comprises the steps of:

resetting a timer;

calculating an amount of elapsed of time from reset; and performing said automatic fine tuning operation of said sub-tuner section when said amount of elapsed time is greater than a predetermined time period.

4. The frequency compensation controlling method as defined in claim 1, wherein said step of performing an automatic fine tuning operation of said main tuner section comprises the steps of:

determining a difference between a local oscillating frequency of said main tuner section and said local oscillating frequency of said sub-tuner section; and executing said automatic fine tuning operation of said main tuner when said difference is greater than a predetermined reference value.

* * * * *